(12) United States Patent
Williams

(10) Patent No.: US 9,996,423 B2
(45) Date of Patent: Jun. 12, 2018

(54) POINT IN TIME SNAPSHOTS USING COPY ON PREDICTED WRITE

(71) Applicant: FALCONSTOR, INC., Melville, NY (US)

(72) Inventor: Timothy Williams, Northport, NY (US)

(73) Assignee: FalconStor, Inc., Melville, NY (US)

( * ) Notice: Subject to any disclaimer, the term of this patent is extended or adjusted under 35 U.S.C. 154(b) by 330 days.

(21) Appl. No.: 14/532,669

(22) Filed: Nov. 4, 2014

(65) Prior Publication Data

US 2015/0127614 A1 May 7, 2015

Related U.S. Application Data

(60) Provisional application No. 61/899,719, filed on Nov. 4, 2013.

(51) Int. Cl.
*G06F 17/30* (2006.01)
*G06F 11/14* (2006.01)
*G06F 3/06* (2006.01)

(52) U.S. Cl.
CPC .......... *G06F 11/1448* (2013.01); *G06F 3/061* (2013.01); *G06F 3/065* (2013.01); *G06F 3/067* (2013.01); *G06F 3/0659* (2013.01); *G06F 3/0689* (2013.01); *G06F 11/1446* (2013.01); *G06F 2201/84* (2013.01)

(58) Field of Classification Search
CPC ..................... G06F 17/30088; G06F 17/30067
USPC .......................... 707/639, 703, 646, 657, 654
See application file for complete search history.

(56) References Cited

U.S. PATENT DOCUMENTS

| 5,778,436 | A * | 7/1998 | Kedem | G06F 12/0862 711/122 |
| 6,182,198 | B1 * | 1/2001 | Hubis | G06F 11/1466 707/999.202 |
| 6,434,681 | B1 * | 8/2002 | Armangau | G06F 11/1466 711/162 |
| 6,694,413 | B1 * | 2/2004 | Mimatsu | G06F 11/1466 707/999.202 |
| 6,711,662 | B2 * | 3/2004 | Peir | G06F 12/0817 711/124 |

(Continued)

OTHER PUBLICATIONS

International Search Report dated Jan. 23, 2015 issued in the corresponding International PCT Application No. PCT/US14/63889.

(Continued)

*Primary Examiner* — Frantz Coby
(74) *Attorney, Agent, or Firm* — Cozen O'Connor; Brandon N. Sklar

(57) ABSTRACT

Systems and methods of writing to a storage system comprise analyzing a plurality of snapshots of data blocks of a storage device and determining a likelihood that a next first write will be to a respective data block based, at least in part, on the analyzed plurality of snapshots. A snapshot is then taken of a selected data block based, at least in part, on the respective likelihood for the selected data block, before receiving a write request to the selected data block. A write request to a respective data block is then received and data is written to the respective data block, if the snapshot of the respective data block had been taken. If the snapshot of the respective data block had not been taken, then a snapshot of the respective data block is taken. Then data is then written to the respective data block.

18 Claims, 7 Drawing Sheets

(56) References Cited

U.S. PATENT DOCUMENTS

| | | | | |
|---|---|---|---|---|
| 7,035,881 | B2* | 4/2006 | Tummala | G06F 17/30067 707/639 |
| 7,165,145 | B2* | 1/2007 | Lam | G06F 11/2064 707/999.202 |
| 7,225,210 | B2* | 5/2007 | Guthrie, II | G06F 3/0608 |
| 7,257,606 | B2* | 8/2007 | Kapoor | G06F 17/30067 |
| 7,296,125 | B2* | 11/2007 | Ohran | G06F 11/1451 707/999.202 |
| 7,363,435 | B1* | 4/2008 | Stenstrom | G06F 12/0815 711/141 |
| 7,426,618 | B2* | 9/2008 | Vu | G06F 11/1469 711/114 |
| 7,434,093 | B2* | 10/2008 | Ohran | G06F 11/1469 714/6.23 |
| 7,440,966 | B2* | 10/2008 | Adkins | G06F 11/1435 |
| 7,571,348 | B2* | 8/2009 | Deguchi | G06F 11/1471 714/15 |
| 7,676,510 | B1* | 3/2010 | Karinta | G06F 17/30088 707/654 |
| 7,676,514 | B2* | 3/2010 | Faibish | G06F 3/061 707/646 |
| 7,734,591 | B1* | 6/2010 | Mercier | G06F 11/1466 707/639 |
| 7,757,057 | B2* | 7/2010 | Sangapu | G06F 11/1435 711/161 |
| 7,792,802 | B1* | 9/2010 | Rao | G06F 11/1461 707/657 |
| 7,870,356 | B1* | 1/2011 | Veeraswamy | G06F 3/0607 711/100 |
| 7,886,119 | B1* | 2/2011 | Cameron | G06F 3/0611 711/114 |
| 8,281,096 | B1* | 10/2012 | Ranade | G06F 11/1461 711/103 |
| 8,364,639 | B1 | 1/2013 | Koryakina et al. | |
| 8,402,008 | B2* | 3/2013 | Adkins | G06F 17/30088 707/703 |
| 8,533,409 | B2* | 9/2013 | Schnapp | G06F 3/0604 711/114 |
| 8,874,524 | B1* | 10/2014 | Zhao | G06F 17/30088 707/639 |
| 8,880,820 | B2* | 11/2014 | Sudhakar | G06F 3/0608 711/162 |
| 9,218,139 | B2* | 12/2015 | Ammons | G06F 3/065 |
| 9,298,633 | B1* | 3/2016 | Zhao | G06F 12/0862 |
| 2003/0158834 | A1* | 8/2003 | Sawdon | G06F 17/30067 |
| 2005/0033930 | A1* | 2/2005 | Haruma | G06F 3/0611 711/162 |
| 2007/0055710 | A1* | 3/2007 | Malkin | G06F 3/0607 |
| 2007/0130228 | A1* | 6/2007 | Breau | G06F 11/1448 |
| 2007/0174569 | A1* | 7/2007 | Schnapp | G06F 3/0604 711/162 |
| 2009/0187719 | A1* | 7/2009 | Yao | G06F 11/1451 711/162 |
| 2010/0241614 | A1 | 9/2010 | Shaull et al. | |
| 2012/0089578 | A1 | 4/2012 | Lam | |
| 2014/0281123 | A1 | 9/2014 | Weber | |

OTHER PUBLICATIONS

Written Opinion of the International Searching Authority dated Jan. 23, 2015 issued in the corresponding International PCT Application No. PCT/US14/63889.

Xiao, Weijun et al. "Implementation and performance evaluation of two snapshot methods on iSCSI target storages." Proc. of NASA/IEEE Conference on Mass Storage Systems and Technologies (2006).

* cited by examiner

POINT IN TIME SNAPSHOTS USING COPY ON PREDICTED WRITE

RELATED APPLICATION

The present application claims the benefit of U.S. Patent Application No. 61/889,719, which was filed on Nov. 4, 2014, is assigned to the assignee of the present application, and is incorporated by reference herein.

FIELD OF THE INVENTION

A method and apparatus for capturing a point in time snapshot of the data in a storage system that uses probabilities calculated from prior snapshots already taken of the storage system to decrease the performance impact on write operations of taking the snapshot.

BACKGROUND OF THE INVENTION

Creating point-in-time copies of data, referred to as snapshots, is one of the data protection techniques used to protect data stored in a storage server. A snapshot is a record of data stored in a storage system at a selected moment in time. A snapshot may be used to recover an earlier version of the data in the event a current version becomes corrupted, or may be copied to another storage device to provide a backup copy of the data, for example. Snapshots are commonly taken at scheduled intervals, such as once or twice an hour, for example, in order to provide maximum protection to the storage system. The time between scheduled snapshots is typically 30-60 minutes, for example. A client may request that scheduled snapshots be performed more or less often. Snapshots may also be initiated manually.

Snapshots algorithms are also typically performed prior to writing to a data block in response to a write request, to preserve the current data in the respective block. After a scheduled snapshot is performed, modification to the protected data in response to a write request, for example, does not take place until the original data to be modified is preserved by copying the data.

Several snapshot algorithms may be used to preserve modified data. One algorithm is Copy on First Write ("COFW"). Another is Redirect on Write ("ROW"). In COFW, on each first write to a data block, the current data stored in the block is copied from the primary volume to a snapshot volume. After copying the data in a respective data block to the snapshot volume, the write operation is performed on the block in the primary volume. A point-in-time image of the data may be recreated by the combination of the primary volume and the snapshot volume or volumes that have been created. Only the first write to a block requires copying of the current data to a snapshot volume. Write I/Os after the first change to a block are performed on the source volume. After the snapshot is created, all subsequent read I/Os are performed on the primary volume. Write input/output ("I/O") after the first change to a block are also performed on the source volume. (See, for example, Weijun Xiao, Yinan Liu, and Qing Yang "Implementation and Performance Evaluation of Two Snapshot Methods on iSCSI Target Storages," Target Storages, Proc. 14$^{th}$ NASA Goddard/23$^{rd}$ Conf. Mass Storage Systems and Technologies (2006) ("Xiao").

FIG. 1 is a Timeline 10 of an example of a COFW procedure. The Timeline 10 shows a snapshot period between scheduled snapshots SNAP 0 and SNAP 1. Two blocks 1, 2 of a portion of a primary storage device 12 are shown. Block 1 includes data A and Block 2 includes data B. At the time of SNAP 0, a snapshot volume SV(0) is created in storage for copies on first writes to respective data blocks in the primary storage, prior to SNAP 1.

At some time after SNAP 0 and before SNAP 1, a write request is received. In this example, the write requests is to write data E to Block 1. This is the first write to Block 1. After the write request is received and prior to performing the write, data A is copied from Block 1 in the primary storage 12 into SV(0). Only after data A is copied to the snapshot volume, the data E is written to Block 1 in the primary storage 12, as shown in FIG. 1. Data Block 2 is not changed in this example.

When SNAP 1 is performed, a new snapshot volume SV(1) is created in scheduled snapshot to store data prior to first writes to respective data blocks in the primary storage 12, between SNAP 1 and the next scheduled snapshot (SNAP 2, which is not shown). SV(0) is available for retrieval at any time if needed to recreate the primary storage 12 at a point-in-time, the conjunction with the current primary storages. Multiple snapshot volumes may need to be retrieved to recreate the primary storage at a time in the past, after multiple snapshots have been taken.

Another example of a snapshot procedure is described in U.S. Pat. No. 7,165,145, which is assigned to the assignee of the present invention and is incorporated by reference herein.

As described above, COFW requires at least three (3) I/O operations upon the first write to a block: 1) reading the data in the respective block from the primary volume; 2) writing the read data from the respective block to the snapshot volume; and 3) writing the new data in the primary volume. Writing metadata to the snapshot volume may be a fourth step. These I/O operations delay the desired write to the primary resource, which may negatively impact application performance. To overcome this, one can perform a redirect-on-write ("ROW"), which leaves the original block in the primary volume intact and the new write operation is performed on the snapshot volume. This eliminates the extra I/O operations of the COFW method. After the snapshot, all subsequent write I/Os are performed on the snapshot volume while read I/Os may be from the primary volume or the snapshot volume, depending on whether the block has been changed since the snapshot. The point-in-time image of the data at the time of a snapshot is the primary volume itself since the primary volume has been read-only since the time of the snapshot. The source volume will be updated at a later time, by copying data from the snapshot volume. (See, for example, Xiao, et al.).

Another example of a snapshot procedure is described in U.S. Pat. No. 7,165,145, which is assigned to the assignee of the present invention and is incorporated by reference herein.

SUMMARY OF INVENTION

Embodiments of the invention mitigate some of the performance impacts of taking snapshots using COFW and related algorithms, by anticipating the next snapshot required based on previous snapshots and performing the snapshot prior to the next write. In one example, multiple snapshots are analyzed to provide a detailed history both in space (respective blocks) and time (when particular blocks are accessed) about the access patterns to the blocks in the storage being snapped. For example, based on the prior X number of snapshots, the probability or likelihood that a particular block will need to be copied into a new snapshot volume prior to a subsequent write request, is calculated. A prediction is then made that the particular block will be needed, before the write occurs. Blocks with a high probability/likelihood of being written to may be copied to a snapshot volume prior to the next write request.

In accordance with an embodiment of the invention, a method of writing data to a storage system is disclosed comprising analyzing a plurality of snapshots of data blocks of a storage device. A likelihood that a next first write will be to a respective data block is determined based, at least in part, on the analyzed plurality of snapshots. A snapshot is taken of a selected data block based, at least in part, on the respective likelihood for the selected data block, before receiving a write request to the selected data block. A write request is received to a respective data block, and data is written to the respective data block if the snapshot of the respective data block has been taken. If the snapshot of the respective data block has not been taken, then a snapshot is taken and then the data is written to the data block. The likelihoods for respective data blocks may be compared to a threshold and a snapshot taken of a respective data blocks meeting the threshold.

In accordance with another embodiment of the invention, a storage system comprises memory and at least one processing device configured to analyze a plurality of snapshots of data blocks of a storage device. The at least one processing device is further configured to determine a likelihood that a next first write will be to a respective data block, based, at least in part, on the analyzed plurality of snapshots. The at least one processing device is further configured to take a snapshot a selected data block based, at least in part, on the respective likelihood for the selected data block, before receiving a write request to the selected data block. A write request is received to a respective data block, and the at least one processing device is further configured to write to the respective data block if the snapshot of the respective data block has been taken. If the snapshot of the respective data block has not been taken, then a snapshot is taken and then the data is written to the data block. The likelihoods for respective data blocks may be compared to a threshold and a snapshot taken of a respective data blocks meeting the threshold.

DESCRIPTION OF EMBODIMENTS OF THE INVENTION

Figure 1:
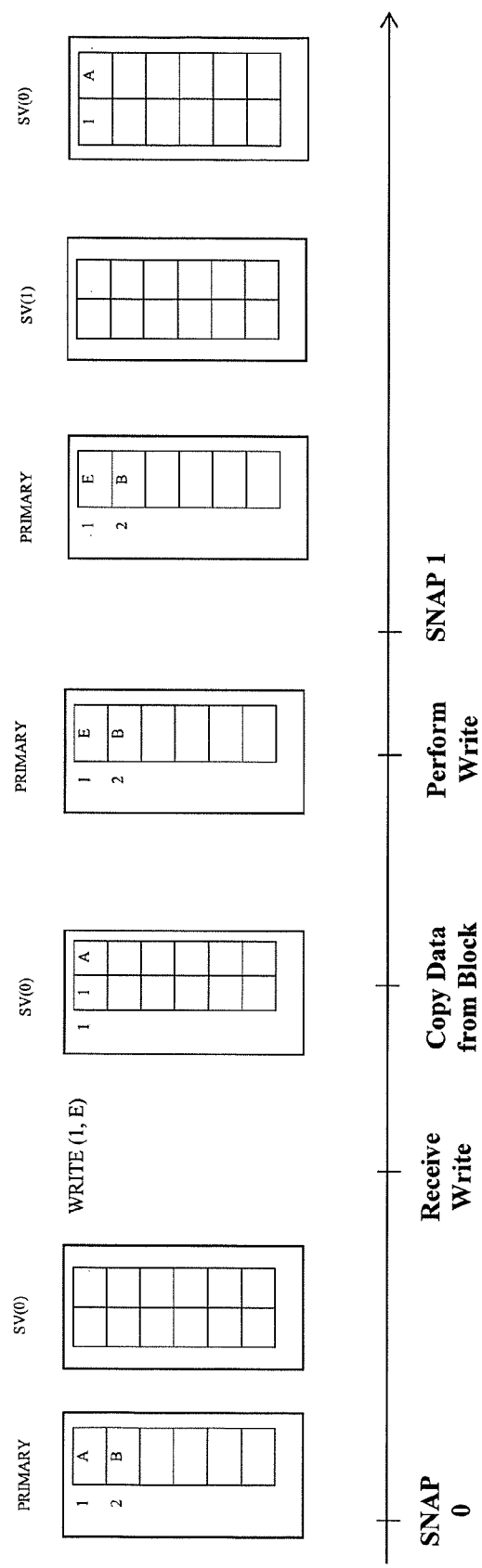
FIG. 1 is a Timeline of an example of a COFW procedure.
Figure 2:
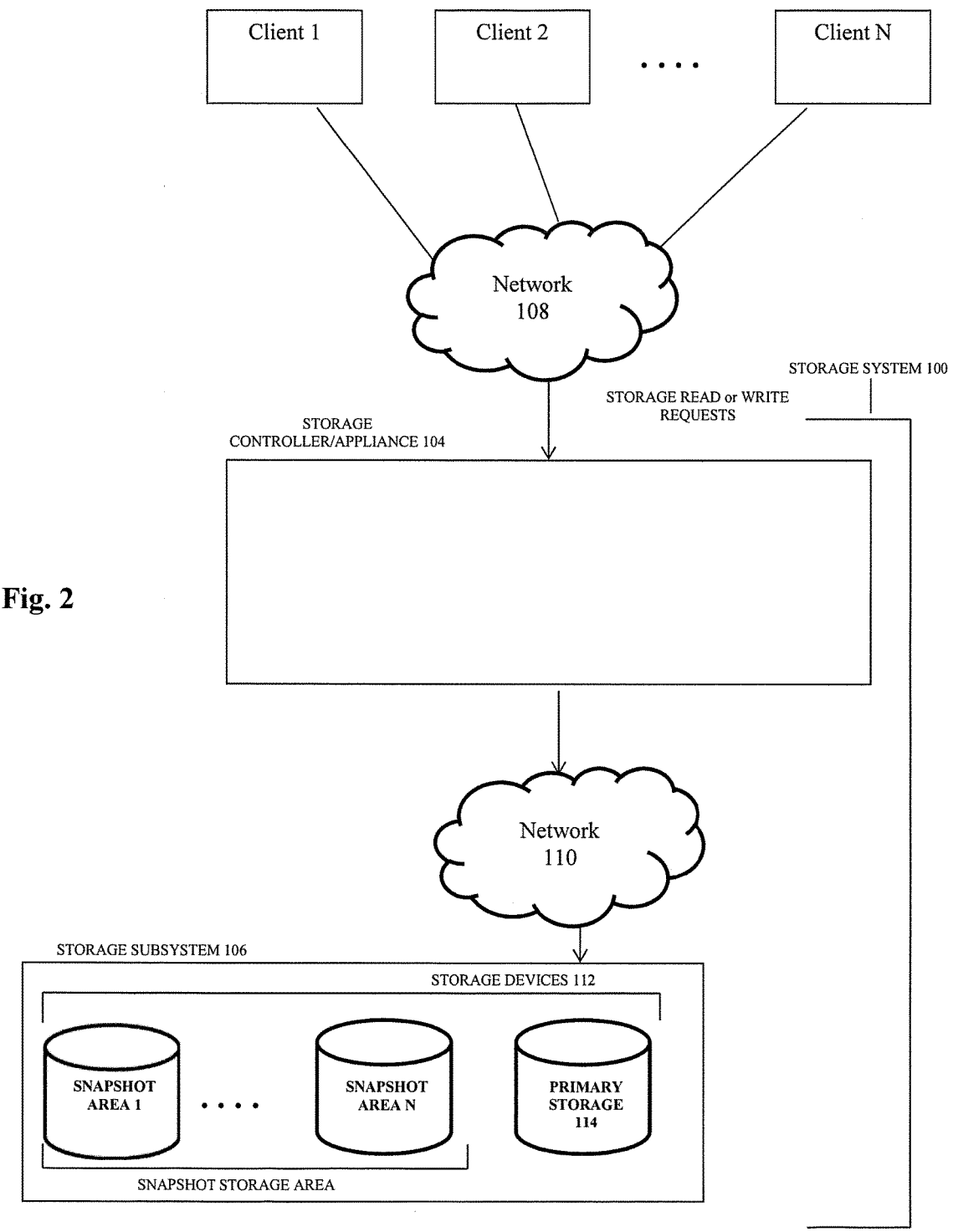
FIG. 2 is a block diagram of a storage system in accordance with an embodiment of the invention.

FIG. 2 is an example of a storage system 100 that can implement embodiments of the invention. The storage system 100 comprises a storage controller/appliance ("SCA") 104 and a storage subsystem 106. Client devices 1, 2 . . . N may be coupled to the SCA 104 via a first network 108. The SCA 104 may be coupled to the storage subsystem 106 via a second network 110. In this example, the second network 110 is also part of the storage system 100. The second network 110 may be the same network as the first network 108, such as the Internet, for example, or may be a different network. The storage subsystem 106 comprises one or more storage devices 112 including a primary storage 114, and snapshot storage areas 1, 2 . . . N. The primary storage 114 is the main storage device or devices used by the system 100 to store client data. The snapshot areas 1 . . . N are used to store snapshots of data. The SCA 104 maps commands and requests, such as read and write commands, received from the client devices 1, 2 . . . N to the correct storage area for the primary storage 114 and carries out the commands, such as to read or write blocks in the primary storage, as is known in the art.

The snapshots areas 1 . . . N are areas in storage created separately after each scheduled or manual snapshot. Snapshot volumes containing data copied during COFW operations are stored in a snapshot area 1 . . . N. The primary storage and the Snapshot Areas 1 . . . N may be part of the same or different storage devices.

The client devices 1, 2 . . . N may comprise any processing device or software application coupled to the storage system 100 that accesses data from a storage system, such as the storage system 100. One or more of the clients 1, 2 . . . N may comprise servers, such as database servers, e-mail servers, and/or file servers, for example. One or more of the client servers may be file server applications running on a workstation, or an email server application running on a desktop PC, for example.

The first and second networks 108, 110 may be implemented as any one of a number of different types of networks. In one example, communications are conducted over the networks 108, 110 by means of IP protocols. In another example, communications are conducted over the first and second networks 108, 110 by means of Fibre Channel protocols. The first and second networks may be, for example, an intranet, a local area network (LAN), a wide area network (WAN), the Internet, a Fibre Channel storage area network (SAN), PCIe, SATA, PAIA, or an Ethernet. The first and second networks may be the same network, separate networks of the same type, or separate networks of different types, for example.

Figure 3:
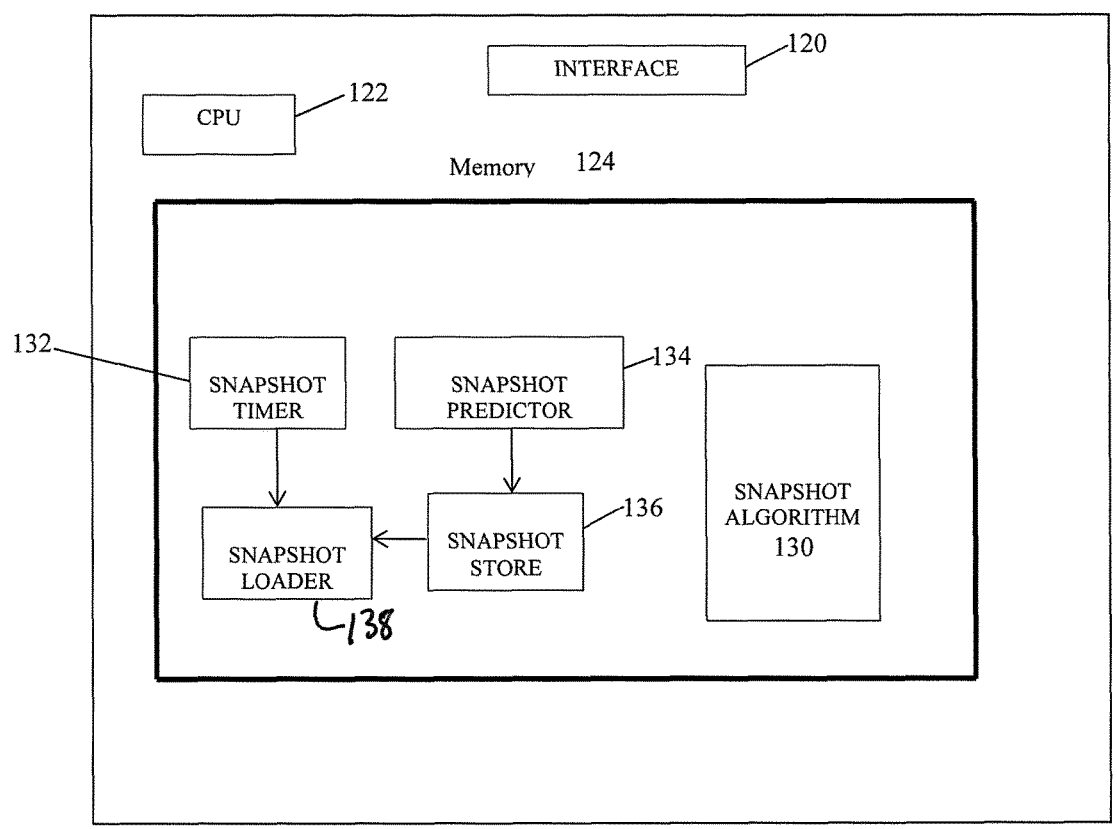
FIG. 3 is a block diagram of the storage controller/appliance in the embodiment of FIG. 1.

FIG. 3 is a block/diagram of the SCA 104, which includes an interface 120, a processing device 122, such as a central processing unit ("CPU"), and memory 124. Multiple processing devices 122, such as multiple CPUs, may be provided. The memory may comprise random access memory ("RAM") and non-volatile memory, such as read only memory ("ROM") and/or NAND flash memory, for example.

The interface 120 provides a communication gateway through which data, commands, and requests may be transmitted between the clients 1, 2 . . . N and the SCA 104 via the first network 108. The interface 120 may be implemented using a number of different mechanisms, such as one or more SCSI cards, enterprise systems connection cards, fiber channel interfaces, modems, network interfaces, or a network hub, for example.

The CPU 122 orchestrates the operation of the SCA 104 and the storage system 100 under the control of software stored in the memory 124, including receiving and processing data processing requests from the clients 1, 2, . . . N, and sending data processing commands, including write and real commands, to the primary storage 114. In an alternative implementation, the CPU 122 is controlled by a combination of software and digital or analog circuitry, or by digital circuitry. An application specific integrated circuit (ASIC) may be used to provide some or all of the described functionality, for example.

The CPU 122 receives data processing requests from the first network 108, formatted according to IP or Fibre Channel protocols, for example. Communications between the CPU 122 and the storage subsystem 106 may be conducted in accordance with SCSI or other storage protocols, for example.

In this example, the SCA 104 includes a snapshot algorithm 130, a snapshot timer 132, a snapshot predictor 134, a snapshot store 136, and a snapshot loader 138, stored in memory 124. The software algorithms and routines may be stored in non-volatile memory and loaded to RAM during operation, for example. These are examples of algorithms that may be provided. One or more after algorithms may be used to provide the functionality described herein.

The snapshot algorithm 130 defines a method of capturing a point in time snapshot of the primary storage 114. In this embodiment, the snapshot algorithm 130 includes a COFW algorithm. The CPU 122 in the SCA 104 defines respective snapshot volumes in the snapshot areas 1 . . . N, and performs COFW the snapshot operation under the control of the snapshot algorithm 130.

The snapshot timer 132 may be a timing software routine or a timing device that triggers an event to cause the CPU 122 to capture a new point in time snapshot of the primary storage 114 contents according to a preset schedule, and causes the snapshot loader to perform copies before writes occur. In the example of FIG. 3, the snapshot timer 132 is a software routine stored in the non-volatile memory 126, as shown in FIG. 3.

The SCA 104 also includes a snapshot predictor algorithm 134, which defines a method that uses historical information about the blocks in the primary storage 114, that have needed to be copied in snapshot volumes prior to performing write requests, to predict which blocks will be needed to be copied in a current snapshot volume for upcoming write requests to predict blocks that will be written to before the next scheduled snapshot.

The snapshot store 136 is defined by the CPU 122 in memory 124, such as in the RAM 124, to maintain the historical snapshot information needed by the snapshot predictor 134. The historical snapshot information includes account of the prior write requests to respective blocks, which may be stored in a Table, for example. The Table may be a Likelihood Table, which correlates respective blocks with likelihoods as probability, for example, as discussed further below. The historical information may also include the time and date of each write request.

The snapshot loader software program 138, to be executed by the CPU 122 whenever a scheduled snapshot is triggered by the snapshot timer 132. When the snapshot is triggered, the snapshot loader software program 138 iterates through the historical information received from the snapshot store 136, applying a likelihood of use metric to each block. For elements with a likelihood of use greater than some specified threshold the CPU(s), under the control of the snapshot loader, will read that information from the primary storage 114 and write it to a new snapshot area 1 . . . N.

In one example of an embodiment of the invention, the blocks having greater than a predetermined probability of being used are identified by the CPU 122, under the control of the snapshot predictor 134, based on past writes in the snapshot store 136, and are scheduled to be copied by the CPU 122 before the next write occurs. The copying may take place in time slots when the system is idle. This allows the CPU 122 to spread the processing involved with copy operations over time, so that the processing has little or no negative impact on performance from due to performing a snapshot.

In one example, embodiments of the invention are implemented when a storage system 100 starts to operate. Since it may take many snapshots before the likelihood table has enough data to reliably predict future writes, in another example implementation of embodiments of the invention begins after a predetermined number of COFWs and snapshots. Embodiments of the invention may also be retrofit into existing storage systems. Past snapshot areas may be analyzed to generate likelihood tables for future writes.

The predetermined probability may be determined by the system 100 or may be set manually by administrative personnel of the respective clients 1, 2 . . . N. Any threshold value may be selected. Thresholds may be in a range of from about 50% to 100%, for example. Since too low of a threshold may result in excess copying of blocks that are not written to, wasting system resources and storage space, thresholds in the range of from about 80% to 100%, or from about 90% to 100% may be used, for example.

The optimum threshold may be based on the history of the system 100, and may change over time. The threshold may be changed automatically or manually if the predictions are not sufficiently matching future writes. For example, if many more copies of blocks are made than are needed, the probability threshold may be raised. Automatic adjustment may be provided by counting the number of copied blocks in a snapshot volume that do not correspond to a subsequent write operation in a period between scheduled snapshots. If the count is above a first level, then the threshold may be raised. The thresholds may be raised in predetermined increments until the count goes below the first level. The increments may also depend on how far from the first level the actual count is.

Similarly, the number of writes to respective blocks that are not stored in a snapshot volume prior to a write may be counted. If that number is greater than a second level, then the probability threshold may be lowered by a preset interval. The decrease interval may be based on how far the count is from the second level, for example.

Copies to a snapshot volume that are not needed may be kept or deleted from the volume. The CPU 122 may count the number of unneeded copies in each snapshot, under the control of a garbage collector routine, for example. If the number of unneeded copies exceeds a predetermined value, the garbage collector routine cause deletion of the unneeded copies. The count by the garbage collector may also be used in the adjustment of the threshold discussed above.

Figure 4A:
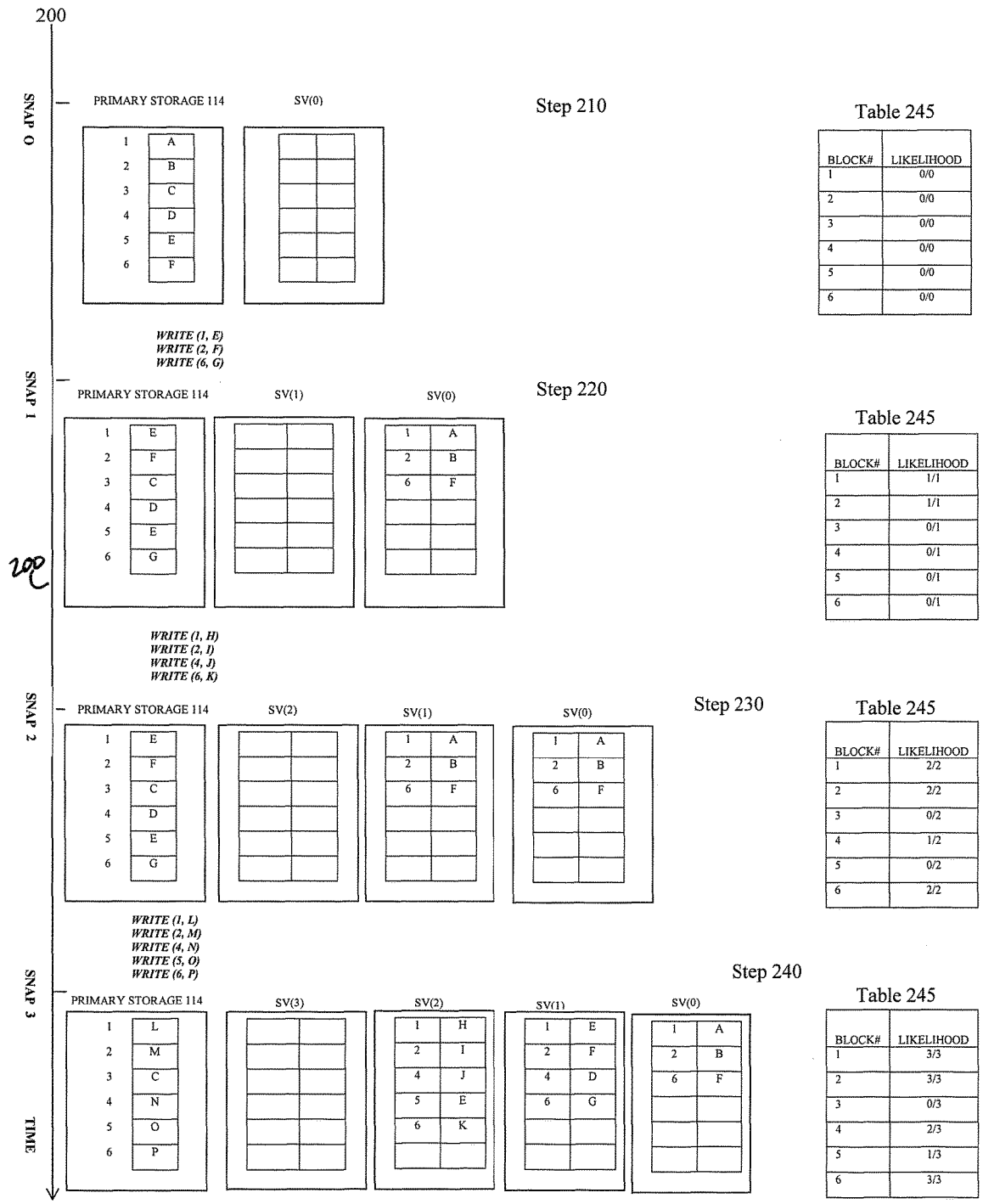
FIGS. 4A-4D is a timeline of a snapshot procedure, in accordance with an embodiment of the invention.

FIG. 4A is a vertical Timeline 200 of the operation of the storage system 100, in accordance with an embodiment of the invention. In FIG. 4A, the Timeline 200 indicates four time periods in terms of scheduled snapshots, Snap 0, Snap 1, Snap 2, and Snap 3, which take place in Steps 210, 220, 230, 240, respectively. At Snap 0, Step 210 a portion of the primary storage 114 is shown including data A in Block 1, data B in Block 2, data C in Block 3, data D in Block 4, data E in Block 5, and data F in Block 6. A snapshot volume SV(0) 1 . . . N is empty at the time of SNAP 0 because no writes snaps have taken place.

Also shown is a Likelihood Table 245, which is maintained by the snapshot predicter algorithm 134 in the snapshot store 136. The Timeline 200 in FIGS. 4A-4D shows the development of the Likelihood Table 245 over time, in accordance with an embodiment of the invention. In this example, the Likelihood Table 245 correlates each block of the primary storage 114 with a likelihood defined as a ratio of first writes to a respective block to the total number of snapshot periods being considered. Since there have been no writes yet, all likelihoods are 0/0.

Between Snap 0 and Snap 1, in Step 210, three (3) writes are received from one or more clients 1, 2 . . . N to write data E to Block 1, data F to Block 2, and data G to Block 6. The data in Blocks 1, 2, and 6 are stored in SV(0) and then the new data is written to Blocks 1, 2 and 6. The Likelihood Table 245 is updated to show the writes to Blocks 1, 2, and 6 as discussed below.

At SNAP 1, in Step 220, a new snapshot volume SV(1) is created. The current states of the primary storage 114 and SV(0) after the writes in Step 210 are shown. In the primary storage 114, data E in Block 1, data F is in Block 2, and data G is in Block 6. The prior data in those Blocks is stored in SV(0), in association with the Blocks of the primary storage, in accordance with COFW.

The Likelihood Table 245 is also shown. The Likelihood Table 245 was updated after the writes in Step 210 to indicate a likelihood of Blocks 1, 2, and 6 being written to again is 1/1 (100%), while the probabilities of Block 3, 4, and 5 being written to is 0/0 (0%). The Likelihood Table 245 in this example was created by the snapshot predictor algorithm 134, which will also update the Table based on new writes/snapshots. The Likelihood Table 245 may be stored in the snapshot store 136, for example.

Between Snaps 1 and 2, the Step 220, four (4) writes are received to Blocks 1, 2, 4, and 6, to write H, I, J, and K, respectively. Snapshots are taken of data Blocks 1, 2, 4, and 6 to copy the data in those blocks to SV(1), in association with the respective blocks. The writes are then performed to the respective blocks in the primary storage 114. The probability table is updated to indicate a likelihood that Blocks 1, 2, and 6 will be written to in the next write of 2/2 (100%), a likelihood that Block 4 will be written to is 1/2 (50%), and a likelihood that Blocks 3 and 5 will be written to is 0/0 (0%), as shown in SNAP 2.

At SNAP 2, Step 230, snapshot volume SV(2) is created. After SNAP 2, five (5) writes are received to Blocks 1, 2, 4, 5 and 6, to write data L, M, N, O, and P to the primary storage 114, respectively. The data in Blocks 1, 2, 4, 5 is copied to be stored in SV(2), then the writes are performed, and the Likelihood Table 245 is updated.

At SNAP(3), Step 240, a new snapshot volume SV(3) is created. The Likelihood Table 245, updated in Step 220, now shows that the likelihoods that the next write will be to Block 1, 2, and 6, are 3/3 (100%), the likelihood that Block 4 will be written to is 2/3 (67%), the likelihood that Block 5 will be written to in the next write is 1/3 (33%), and the likelihood that Block 3 will be written to next is 0/2 (0%). Snapshot volumes SV(3), SV(2), and SV(0) containing copied data are also shown. The Timeline 200 continues a horizontal line 202 in FIG. 4B, where selected individual steps of the process are shown within SNAP periods.

Figure 4B:
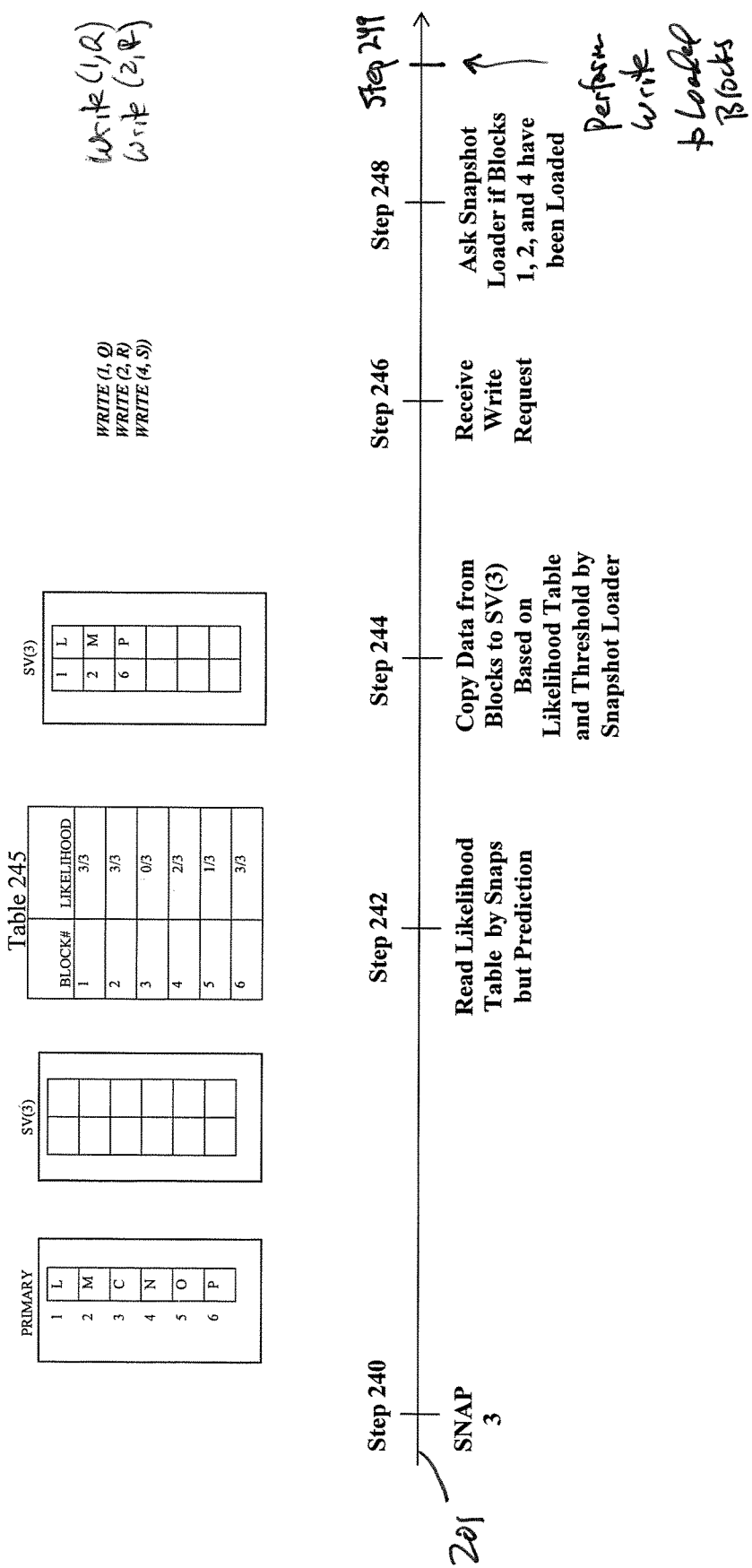

The Snapshot Timeline in FIG. 4A continues in FIG. 4B in a horizontal timeline 201. The primary storage 114 and the empty SV(3) from FIG. 4A are also shown in FIG. 4, after SNAP 3, at Step 240. SV(0), SV(1), and SV(2) are not shown for ease of illustration. In this example, the copying of data blocks prior to write requests to those data blocks, in accordance with embodiments of the invention, begins with a likelihood threshold of at least 75%. The CPU 22, under the control of the snapshot loader 138 reads the Likelihood Table and identifies blocks with probabilities greater than 75%, in Step 242. Since the likelihoods in the Likelihood Table Block 1, Block 2, and Block 6 are 3/3 (100%), in accordance with embodiments of the invention, the processing device of the SCA schedules Blocks 1, 2, and 6 to be copied to SV(3) before the next write to request is received. Since the probability that block 4 will need to be copied in the next copy on write operation is 2/3 (67%), which is below the threshold of 75%, the data in Block 4 is not scheduled to be copied, in this example.

The CPU 122, under the control of the snapshot loader 136, then copies the scheduled Blocks 1, 2, and 6 to the snapshot volume SV(3), in Step 244.

Write requests are then received, to write Q to Block 1, R to Block 2, and S to Block 4, in Step 246. The CPU 122 asks the snapshot loader 136, which records the data copied to SV(3) in Step 246, if data from Blocks 1, 2, and 4 has been copied to SV(3) already, in Step 248. The snapshot loader 136 may create and update a table of snapshots as the snapshots are performed, for example. It is noted that the write requests are not necessarily received at the same time, and additional first write requests may also be received in the period between SNAP 3 and SNAP 4.

Since the data in Blocks 1 and 2 has already been copied to the snapshot volume SV(3), those writes may be performed immediately, in Step 249, without having to copy data into the snapshot volume SV(3). These writes are therefore performed faster than if COFW had to be performed.

Figure 4C:
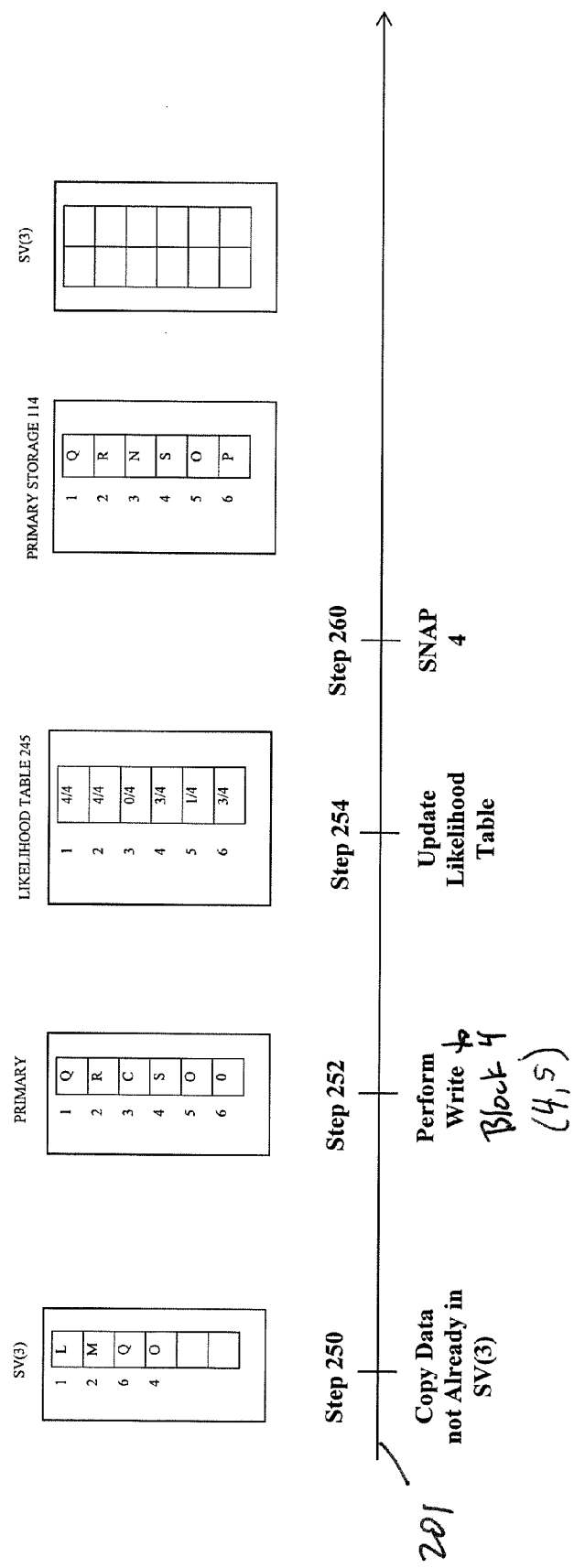
Figure 4D:
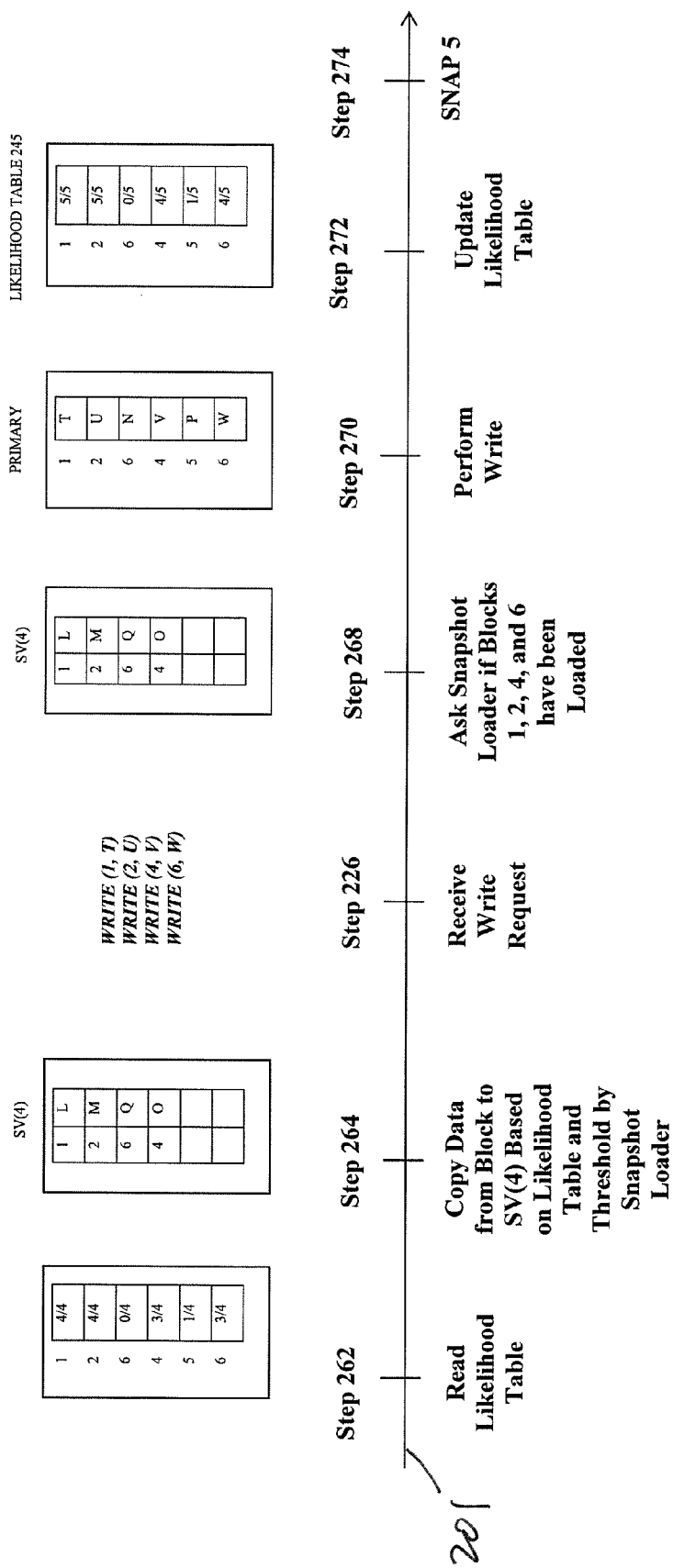

The horizontal Timeline 201 continues in FIG. 4C. Since the data in the data Block 4 has not been copied to the snapshot volume SV(3), a snapshot is taken of the data Block 4 by the snapshot algorithm 130 and the snapshot loader 138, in Step 250. Then the new data is written to the data Block 4, in Step 252.

The Likelihood Table is then updated, in Step 254, by the snapshot predictor 134.

SNAP 4 takes place in Step 260. A new snapshot volume SV(4) is created by the CPU 122, under the control of the snapshot algorithm 130. SV(4) is empty at Step 260. The horizontal Timeline 201 continues in FIG. 4D where the Likelihood Table 245 is read in Step 262.

The snapshot volume SV(4) is filled with data from the data blocks of the primary storage 114, based on the Likelihood Table 245, in Step 264. In this Step 264, since the threshold is 75%, the data in data Block 4 (S) is copied, along with the data in Block 1, 2, and 6 (Q, R, and P, respectively) are copied into SV(4).

Write requests (1, T), (2, U), (4, V), and (6, W) are received in Step 266. Since the data in Blocks 1, 2, 4, and 6 are already stored in SV(4), no additional data needs to be copied into SV(4) and the writes may be performed faster than if data had to be copied into SV(4) first.

The Likelihood Table is updated in Step 272, and Snap 5 takes place in Step 274. The process continues in the same manner as described in FIGS. 4A-4D.

In accordance with embodiments of the invention, sequential write patterns (writes to data Blocks 1, 2, 3, or 7, 8, 9, 10, for example) or time of day usage patterns may also be determined. For example, Block 10 may have a likelihood of having a first write below the threshold. However, Block 10 might have a likelihood of having a first write immediately after Block 9 has a first write that is greater than the threshold. In another example, Block 10 might have a likelihood of having a first write greater than the threshold on Monday mornings, or all weekday mornings, at 9 AM or between 9 AM and 10 AM, or on Tuesdays, for example.

Such patterns may be determined by the CPU 122 under the control of the snapshot predictor 134 based on data that correlates first writes and/or snapshots with time, for example. Such data may be stored in the snapshot predictor 134, for example, which may record the snapshot of the block and the time of the snapshot. Sequential data may be recorded in the form of a sequential tree, for example. The CPU 122 may then search the data for time of day and/or day of week patterns and/or sequential patterns. The snapshot loader 130 and the CPU 122 would have access to a calendar and clock (not shown). The Likelihood Table 245 may then include the likelihoods for first writes to respective blocks based on time of day, day of week, and/or sequence, for example, or additional Tables may be created and stored in the snapshot store 136. Different thresholds may be applied to these likelihoods and may be adjusted, as discussed above. The snapshot predictor 134 may compare the data in the Tables to the applicable thresholds, which may also be stored in the memory 124, for example. Snapshot volumes may be loaded with data from blocks meeting the likelihood thresholds for time of day, day of the week, and/or sequences, as discussed above with respect to first writes.

It will be appreciated by those skilled in the art that changes may be made to the embodiments described herein, without departing from the spirit and scope of the invention, which is defined by the following claims.

I claim:

1. A method of writing to a storage system, comprising:
prior to receiving a current first write request to a respective data block:
analyzing a plurality of snapshots of a plurality of data blocks of a storage device, the snapshots being taken in response to prior first write requests;
determining a likelihood that the current first write request will be to a respective one of the plurality of data blocks based, at least in part, on the analyzed plurality of snapshots; and
taking a snapshot of a selected respective one of the plurality of data blocks based, at least in part, on the determined likelihood for the selected data block;
the method further comprising:
receiving the current write request to the respective data block; and
writing data to the respective data block in response to the current write request, if the snapshot of the respective data block has been taken.

2. The method of claim 1, comprising, if the snapshot of the respective data block has not been taken:
taking a snapshot of the respective data block; and then
writing data to the respective data block in response to the current write request.

3. The method of claim 1, comprising:
recording the snapshot of the respective data block in a record;
determining whether a snapshot of the respective data block has been taken by analyzing the record.

4. The method of claim 1, wherein taking the snapshot comprises storing the data in a snapshot volume.

5. The method of claim 1, further comprising:
determining the likelihood based on the number of first writes to the respective data block in the analyzed snapshots.

6. The method of claim 4, wherein the likelihood comprises a ratio of the number of first writes to the respective data block to a number of snapshot periods.

7. The method of claim 1, comprising:
determining a likelihood that the current first write request will be to the selected data block based, at least in part, on the analyzed plurality of snapshots and a time of day of each of the respective snapshots; and
taking a snapshot of the selected data block based, at least in part, on the likelihood for the respective data block and a current time of day, before receiving the current write request.

8. The method of claim 1, comprising:
determining a likelihood that the current first write request will be to a respective data block based, at least in part, on identification of a numerical sequence in the plurality of analyzed snapshots; and
taking a snapshot of the selected data block if the respective data block is in an identified sequence.

9. The method of claim 1, comprising:
comparing the determined likelihood to a threshold; and
taking the snapshot of the selected data block if the likelihood for the selected data block meets the threshold.

10. A storage system comprising:
memory; and
at least one processing device configured to, prior to receiving a current first write request to a respective data block:
analyze a plurality of snapshots of a plurality of data blocks of a storage device the snapshots being taken in response to prior first write requests;
determine a likelihood that the current first write request will be to a respective one of the plurality of data blocks based, at least in part, on the analyzed plurality of snapshots; and
take a snapshot of a selected one of the plurality of data blocks based, at least in part, on the determined likelihood for the respective data block;
the at least one processing device being further configured to:
receive the current write request to the respective data block; and
write data to the respective data block, if the snapshot of the respective data block has been taken.

11. The system method of claim 10, wherein, if the snapshot of the respective data block has not been taken:
take a snapshot of the respective data block; and then
write data to the respective data block in response to the current write request.

12. The storage system of claim 10, wherein the at least one processing device is configured to:
record the snapshot of the respective data block in a record; and
determine whether the snapshot of the respective data block has been taken by analyzing the record.

13. The storage device of claim 10, wherein the at least one processing device is configured to:
determine the likelihood based on the number of first writes to the respective data block in the analyzed snapshots.

14. The storage system of claim 13, wherein:
the likelihood comprises a ratio of the number of first writes to the respective data block to a number of snapshot periods.

15. The storage system of claim 10, wherein the at least one processing device is configured to:
determine the likelihood based, at least in part, on the analyzed plurality of snapshots and a time of day of each of the respective snapshots; and
taking a snapshot of a respective data block based, at least in part, on the respective likelihood for the respective data block and a current time of day.

16. The storage system of claim 10, wherein the at least one processing device is configured to:
determine the likelihood based, at least in part, on identification of a numerical sequence in the analyzed plurality of snapshots; and taking a snapshot of a respective data block if the respective data block is in an identified sequence.

17. The system of claim 10, wherein the at least one processing device is configured to:
   compare the determined likelihood to a threshold; and
   take the snapshot of the selected data block if the likelihood for the selected data block meets the threshold.

18. The system of claim 10, wherein taking the snapshot comprises storing the data in a snapshot volume.

\* \* \* \* \*